United States Patent
Bröring et al.

(10) Patent No.: US 11,971,720 B2
(45) Date of Patent: Apr. 30, 2024

(54) METHOD FOR PREVENTING A COLLISION BETWEEN AN AUTONOMOUS VEHICLE AND A USER IN A MOVEMENT RANGE OF THE AUTONOMOUS VEHICLE AND SYSTEM

(71) Applicant: Robert Bosch GmbH, Stuttgart (DE)

(72) Inventors: Arne Bröring, Munich (DE); Thomas Jell, Munich (DE); Andreas Ziller, Oberhaching (DE)

(73) Assignee: ROBERT BOSCH GMBH, Stuttgart (DE)

( * ) Notice: Subject to any disclaimer, the term of this patent is extended or adjusted under 35 U.S.C. 154(b) by 659 days.

(21) Appl. No.: 17/260,736

(22) PCT Filed: Jul. 1, 2019

(86) PCT No.: PCT/EP2019/067611
§ 371 (c)(1),
(2) Date: Jan. 15, 2021

(87) PCT Pub. No.: WO2020/015995
PCT Pub. Date: Jan. 23, 2020

(65) Prior Publication Data
US 2021/0263520 A1    Aug. 26, 2021

(30) Foreign Application Priority Data
Jul. 16, 2018  (DE) .................... 10 2018 211 796.9

(51) Int. Cl.
*B60K 35/00*    (2006.01)
*B60K 35/28*    (2024.01)
(Continued)

(52) U.S. Cl.
CPC .......... *G05D 1/0214* (2013.01); *B60K 35/00* (2013.01); *G08G 1/166* (2013.01); *B60K 35/28* (2024.01); *B60K 2360/166* (2024.01)

(58) Field of Classification Search
CPC ......... G05D 1/0214; G05D 2201/0213; G05D 2201/0216; G05D 1/0282; B60K 35/00;
(Continued)

(56) References Cited

U.S. PATENT DOCUMENTS

| 9,884,585 B1 * | 2/2018 | Lubbers .............. B60W 30/095 |
| 2009/0043440 A1 * | 2/2009 | Matsukawa .......... G05D 1/0238 |
| | | 701/25 |

(Continued)

FOREIGN PATENT DOCUMENTS

| DE | 102012104312 A1 | 5/2013 |
| DE | 102013003959 A1 | 1/2014 |

(Continued)

OTHER PUBLICATIONS

German Search Report cited in corresponding German application No. 10 2018 211 796.9, dated Feb. 28, 2019; 8pp.

(Continued)

*Primary Examiner* — Peter D Nolan
*Assistant Examiner* — Ashley L Redhead, Jr.
(74) *Attorney, Agent, or Firm* — NORTON ROSE FULBRIGHT US LLP; Gerard A. Messina

(57) ABSTRACT

The invention relates to a method for preventing a collision between an autonomous vehicle (A) and a user (B) in a movement range of the autonomous vehicle comprising the steps: receiving a time-dependent, planned path (P1) of the autonomous vehicle (A) and a time-dependent, planned path (P2) of the user (B), determining a time-dependent path network by means of a path network unit (8), wherein the time-dependent path network describes the planned paths (Continued)

(P1, P2), determining collision information which describes an overlap of the planned paths (P1, P2) in the time-dependent path network, determining a safe zone (23) for the user on the basis of the collision information, wherein the safe zone (23) describes an area in the movement range which is safe for the user (B) in respect of a collision with the autonomous vehicle (A), and making available a display (20) for the user (B) by means of a display device (19), wherein the display (20) describes the safe zone (23).

20 Claims, 2 Drawing Sheets

(51) Int. Cl.
G05D 1/00 (2006.01)
G08G 1/16 (2006.01)

(58) Field of Classification Search
CPC .. B60K 2370/166; G08G 1/166; G08G 1/005; G08G 1/163; B60W 30/0956; B60W 60/0011
See application file for complete search history.

(56) References Cited

U.S. PATENT DOCUMENTS

| | | | |
|---|---|---|---|
| 2013/0120130 A1 | 5/2013 | Cha | |
| 2015/0042485 A1 | 2/2015 | Suessemilch | |
| 2015/0228195 A1* | 8/2015 | Beaurepaire | B60Q 1/547 340/907 |
| 2015/0336502 A1* | 11/2015 | Hillis | B60Q 1/547 701/23 |
| 2017/0103640 A1 | 4/2017 | Deuter | |
| 2017/0345292 A1* | 11/2017 | Haran | G08G 1/166 |
| 2018/0039844 A1 | 2/2018 | Nordbruch | |

FOREIGN PATENT DOCUMENTS

| | | |
|---|---|---|
| DE | 102013215409 A1 | 2/2015 |
| DE | 102015202488 A1 | 8/2016 |
| DE | 102015219511 A1 | 4/2017 |
| DE | 102016007014 A1 | 12/2017 |

OTHER PUBLICATIONS

PCT International Search Report and Written Opinion of International Searching Authority dated Aug. 21, 2019 corresponding to PCT International Application No. PCT/EP2019/067611; 11pp.

* cited by examiner

METHOD FOR PREVENTING A COLLISION BETWEEN AN AUTONOMOUS VEHICLE AND A USER IN A MOVEMENT RANGE OF THE AUTONOMOUS VEHICLE AND SYSTEM

CROSS REFERENCE TO RELATED APPLICATIONS

This present patent document is a § 371 nationalization of PCT Application Serial Number PCT/EP2019/067611 filed Jul. 1, 2019, designating the United States, which is hereby incorporated in its entirety by reference. This patent document also claims the benefit of DE 102018211796.9 filed Jul. 16, 2018 which is also hereby incorporated in its entirety by reference.

FIELD

Embodiments relate to a method for preventing a collision between an autonomous vehicle and a user in a movement range of the autonomous vehicle.

BACKGROUND

Autonomous vehicles are increasingly becoming a reality. The manufacturers are attempting to increase the autonomy of motor vehicles and trucks in road traffic. Autonomous vehicles, such as for example unmanned forklift trucks, are in productive use in warehouses and at production sites in order to optimize the logistics chain. Both in road traffic and in industry the avoidance of collisions between the autonomous vehicles and users or people is of the highest priority.

US 2015/228195 A1 and US 2017/345292 A1 disclose, for example, an improved way of taking into account pedestrians who are crossing a road. US 2015/228195 A1 discloses, for example, the displaying of a pedestrian crossing on the road.

U.S. Pat. No. 9,884,585 B1 discloses a comparison of the respective path of a vehicle and of a pedestrian and a provision of a display for the pedestrian.

In the field of road traffic, the technological solutions for the challenge are concentrated on the optimization of the use of onboard sensors. For example, vehicles are known that include radar sensors for sensing the surroundings. Both in road traffic and in industry it is known that free passage or a safe zone is indicated to a user, for example, by the autonomous vehicle stopping in front of the user. However, this is a rather implicit indication. In industry it is additionally known to use onboard signals of the autonomous vehicles to indicate a risk. For example, corresponding flashing lights on the autonomous vehicles are used. However, this is only a preventative step.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments disclose a solution as to how a collision may be reliably prevented between an autonomous vehicle and a user in a movement range of the autonomous vehicle.

A method serves to prevent a collision between an autonomous vehicle and a user in a movement range of the autonomous vehicle. The method includes receiving a time-dependent, planned path of the autonomous vehicle and a time-dependent, planned path of the user. Furthermore, the method includes determining a time-dependent path network by a path network unit, wherein the time-dependent path network describes the planned paths. In addition, the method includes determining collision information that describes an overlap of the planned paths in the time-dependent path network, and determining a safe zone for the user on the basis of the collision information, wherein the safe zone describes an area in the movement range that is safe for the user with respect to a collision with the autonomous vehicle. Finally, the method including providing a display for the user by a display device, wherein the display describes the safe zone.

The method is intended to be used to prevent a collision between the autonomous vehicle and the user. The user may be a person who is located in the movement range of the autonomous vehicle. The movement range describes the area in which the autonomous vehicle is maneuvered autonomously. At least the path network unit is used to carry out the method. A time-dependent path network is determined by the path network unit. The time-dependent path network describes at least the planned paths of the autonomous vehicle and of the user. The planned paths of the autonomous vehicle and of the user therefore describe how the autonomous vehicle and the user will move in future. The respective planned paths may describe, for example, corresponding reference points along the path and associated times. On the basis of the planned paths, it is possible to determine the time at which the user and the autonomous vehicle will be located at which position.

The collision information is determined by the path network unit. The collision information describes whether there are overlaps between the planned paths in the time-dependent path network or not. A safe zone or a free passage may then be determined in accordance with the collision information by the path network unit. The safe zone describes an area in the movement range of the autonomous vehicle that is safe for the user with respect to a collision with the autonomous vehicle. In other words, no overlap therefore occurs between the planned paths in the safe zone. In the safe zone there is therefore no risk of a collision between the autonomous vehicle and the user. On the basis of the safe zone, the user is provided with a display that describes the safe zone. In other words, the safe zone or the free zone is therefore displayed to the user.

In comparison with known methods for preventing a collision between an autonomous vehicle and a user, the method includes an advantage that the collision is prevented in a centralized fashion, and the safe zone or free passages are signaled explicitly to the user. The central collision prevention is carried out by the mechanism for managing the time-dependent path network by the path network unit. The explicit signaling is carried out by the display device, where the display is determined on the basis of the evaluation of the time-dependent path network. Overall, a collision between an autonomous vehicle and a user may therefore be prevented more reliably.

In addition, an unsafe zone, in which there is a risk of a collision between the autonomous vehicle and the user, and a zone of increased attention between the safe zone and the unsafe zone are determined on the basis of the collision information. The unsafe zone and the zone of increased attention are also displayed to the user. The safe zone may be displayed to the user, for example, in green. Furthermore, the unsafe zone may be displayed in red. The zone of increased attention, that describes a transition area between the safe zone and the unsafe zone, may be displayed, for example, in orange. Therefore, the user may easily perceive which route he has to take and whether he is still in the safe zone.

The planned paths may be received by a communication unit and are transmitted to the path network unit. Alternatively, or additionally, the collision information is transmitted from the path network unit to the communication unit. The communication unit serves to communicate with the autonomous vehicle and the user or a terminal of the user. The communication unit may receive information or signals from the autonomous vehicle and/or the user and may transmit them thereto. For example, the communication unit may receive information or data relating to the planned paths from the autonomous vehicle and the user. The communication unit further serves to communicate with the path network unit. The planned paths or corresponding data that describe the planned paths may be transmitted to the path network unit by the communication unit. The communication unit may also receive the collision information from the path network unit. In addition, the communication unit may be configured to actuate the display device to present the display. This may provide that reliable communication is carried out.

In an embodiment, in addition to the planned path of the user a reservation for the planned path is received, and the reservation is confirmed in accordance with the collision information. The user may at least indirectly transmit the reservation, together with the planned path, to the communication unit, and the data may then be transmitted to the path network unit. The reservation may relate to the entire planned path of the user. It is also possible to provide that the reservation relates to an overlap of the planned paths of the autonomous vehicle and of the user. If it is detected by the path network unit on the basis of the collision information that there is no risk of a collision for the reserved area of the path, the reservation may be correspondingly confirmed. A corresponding signal may be transmitted to the user or to a terminal of the user. The reservation confirmation may also be provided directly by displaying the safe zone.

In an embodiment, blocking information is transmitted to the autonomous vehicle if the collision information describes an overlap of the planned paths. The blocking information describes that the path that is planned by the autonomous vehicle is blocked. In order to protect the user against a collision with the autonomous vehicle, a relatively high priority may be assigned to the vehicle. If it is detected on the basis of the collision information that an overlap of the planned paths is present, a block may be issued for the travel of the autonomous vehicle along the planned path. A collision between the autonomous vehicle and the user may be reliably prevented.

The planned path of the autonomous vehicle may be changed in accordance with the blocking information, and the changed path is transmitted to the path network unit. If the autonomous vehicle receives the blocking information, a first variant includes where the autonomous vehicle changes the planned path. A changed path that deviates from the original planned path is therefore determined. A further variant includes where after the reception of the blocking information the autonomous vehicle carries out the travel on the planned path but adapts the travel correspondingly. The speed of the autonomous vehicle may be adapted, or the autonomous vehicle may be correspondingly stopped during the travel along the planned path. The changed, time-dependent path may be transmitted to the path network unit mediated by the communication unit. The path network unit may update the time-dependent path network on the basis of the changed path.

Furthermore, it is advantageous if a position of the autonomous vehicle and/or a position of the user are/is determined continuously, and the planned paths are updated continuously. For example, corresponding sensors may be used by which the autonomous vehicle and/or the user may be continuously sensed. On the basis of the sensed positions, it is then possible to update the planned path of the autonomous vehicle and/or the planned path of the user continuously and make them/it available to the path network unit. The path network unit may update the time-dependent path network continuously. It is also provided that the communication unit may be determined continuously by the path network unit. A collision between the autonomous vehicle and the user may be prevented with a high level of certainty.

In a further embodiment, the user is informed about a possible collision with the autonomous vehicle if it is detected on the basis of the collision information that the planned paths overlap. There may be provision that the autonomous vehicle that is moving is assigned a higher priority than the user or the person since the autonomous vehicle cannot be easily brought to a standstill. If the possible collision or the overlap of the planned paths is detected when there is such a prioritization of the autonomous vehicle, corresponding information may be transmitted to the user. The user may therefore be informed that he will collide with the autonomous vehicle. The priorities may be distributed as desired.

According to an embodiment, changes to the planned paths are determined by the path network unit, and the changes are transmitted to the autonomous vehicle and/or the user. For example, the current positions and destinations of the autonomous vehicle and/or of the user may be monitored continuously by the path network unit. The path network unit may determine optimum paths for the autonomous vehicle and/or the user on the basis of the current positions and/or the destinations. The paths may then be transmitted, for example, as a suggestion to the autonomous vehicle and/or the user. The suggestion for an optimized path may be transmitted to the autonomous vehicle, and the display, that describes the safe zone and that is presented to the user, is correspondingly adapted. This permits reliable prevention of a collision between the autonomous vehicle and the user. In addition, the paths of the participants may be optimized. For example, by the path network unit it is possible to determine whether the autonomous vehicle arrives at a destination more quickly if it changes its path or if it moves along the planned path and in the process interrupts the travel.

A virtual crosswalk may be displayed as the display to the user. The virtual crosswalk or an image of a crosswalk may be displayed to the user in the free zone. For example, a crosswalk is displayed in the area in which the planned paths of the user and of the autonomous vehicle overlap. If the autonomous vehicle is moved, for example, in a corridor or on a route, the virtual crosswalk or the image of the crosswalk may be displayed on the route. Therefore, it is intuitively communicated to the user that he may enter or may cross through the area in which the crosswalk is displayed.

In an embodiment, the display device is part of a terminal that may be carried by the user. The portable terminal may be, for example, a smartphone, a tablet, or the like. A corresponding application may be made to run on the terminal in order to provide the display. An image of the movement range of the autonomous vehicle may be presented on the display device, that is formed, for example, by a screen of the terminal. In addition, the display may be presented. The portable terminal may be VR glasses, data glasses or the like. The terminal may be a visual output device that is worn on the user's head.

In an embodiment, the display is projected onto a floor, and/or the display is displayed on the floor by the display device. The display may be projected, for example, onto the floor. Corresponding projection devices may be used that are mounted, for example, on a ceiling of an industrial building. In addition, the projection devices may be attached to the autonomous vehicle. According to an embodiment, a floor on which corresponding display elements are present that together form the display device may be provided, for example, in an industrial building, a warehouse or a factory. The display elements may be, for example, corresponding OLED displays or LED strips.

The method may be carried out in a factory and/or in a warehouse. The method may be used, for example, in a factory or production building in which the autonomous vehicle serves to support the fabrication. The user may be a pedestrian or worker who is also moving in the factory or in the warehouse building. The method is therefore suitable for industry. There may also be provision that the method is used in road traffic.

The method has been described for an autonomous vehicle and a user. The method may also be expanded to a plurality of autonomous vehicles and/or a plurality of users.

A system is provided to prevent a collision between an autonomous vehicle and a user in a movement range of the autonomous vehicle. The system includes a path network unit for receiving a time-dependent, planned path of the autonomous vehicle and a time-dependent, planned path of the user. In addition, the path network unit is configured to determine a time-dependent path network. The time-dependent path network describes the planned paths. The path network unit is configured to determine collision information that describes an overlap of the planned paths in the time-dependent path network. The path network unit is also configured to determine a safe zone for the user on the basis of the collision information. The safe zone describes an area in the movement range that is safe for the user with respect to a collision with the autonomous vehicle. Furthermore, the system includes a display device for providing a display for the user. The display describes the safe zone. Furthermore, the system may include a communication unit that is configured to communicate or transmit data between the autonomous vehicle, the user or a terminal of the user and the path network unit.

DETAILED DESCRIPTION

Figure 1:
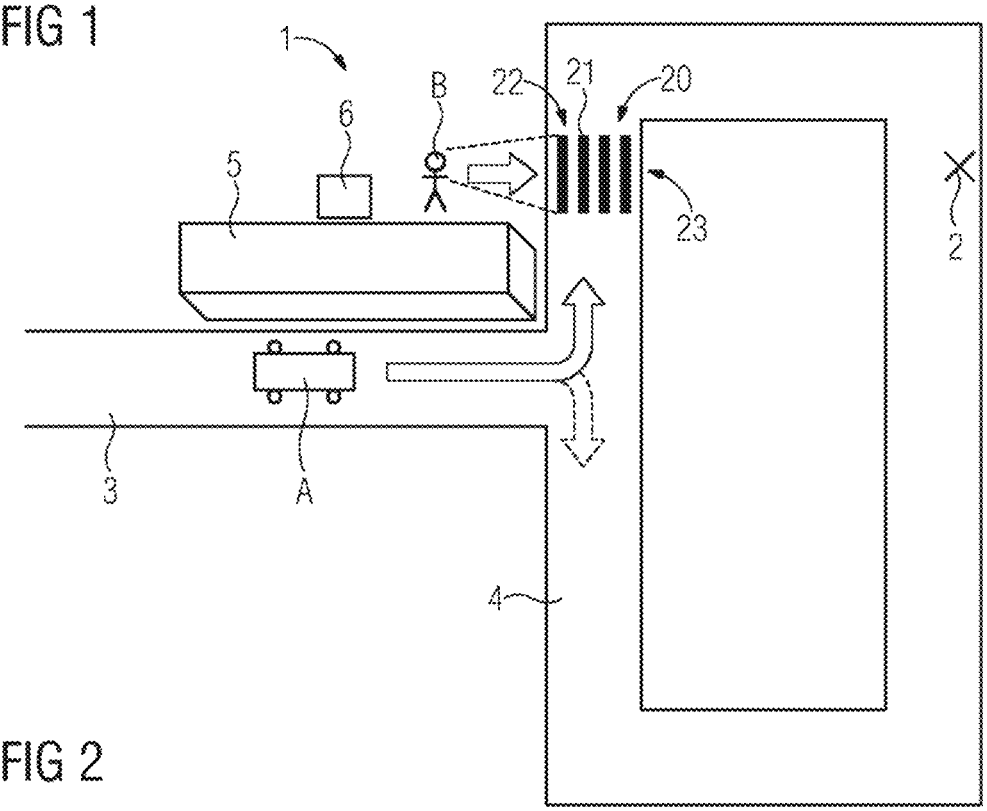
FIG. 1 depicts a schematic illustration of a warehouse building in which an autonomous vehicle and a user are located according to an embodiment.

FIG. 1 depicts a schematic illustration of a factory 1 in which an autonomous vehicle A and a user B are located. The autonomous vehicle A may be, for example, an autonomous forklift truck. The user B is a human or a pedestrian. The autonomous vehicle A is located on the route to a destination 2. The autonomous vehicle A is located here in a first corridor 3 and is planning the route to the destination 2 via a second corridor 4, wherein it plans to turn off to the left from the first corridor 3 into the second corridor 4. The user B would like to cross the second corridor 4. The view of the autonomous vehicle A to the user B is obstructed by a wall 5 here. As a result, there is an increased risk of a collision taking place between the autonomous vehicle A and the user B.

Figure 2:
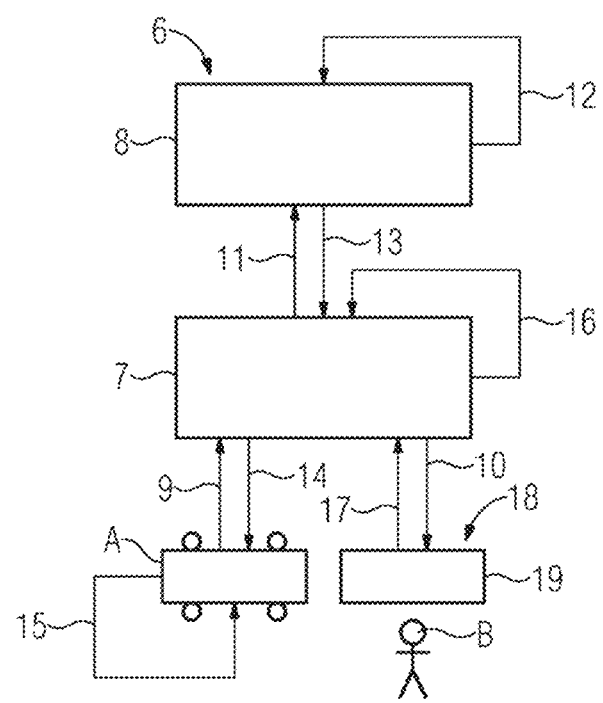
FIG. 2 depicts a schematic illustration of a system for avoiding a collision between the autonomous vehicle and the user according to an embodiment.

In order to avoid the collision between the autonomous vehicle A and the user B, a system 6 is used. The system 6 is illustrated schematically in FIG. 2. The system 6 includes a communication unit 7 that receives a time-dependent, planned path P1 from the autonomous vehicle A. This is indicated here by the arrow 9. The communication unit 7 may receive a time-dependent, planned path P2 from the user B. This is indicated by the arrow 10. The user B may transfer a reservation for his planned path P2 together with the planned path P2.

The system 6 includes a path network unit 8 that is connected to the communication unit 7 for transmitting data. The planned paths P1, P2 are transmitted from the communication unit 7 to the path network unit 8 (arrow 11). A time-dependent path network, that describes the planned paths P1, P2, is determined by the path network unit 8. This is indicated by the arrow 12. A collision signal, that describes whether an overlap occurs between the planned paths P1, P2, is determined by the path network unit 8.

Figure 3:
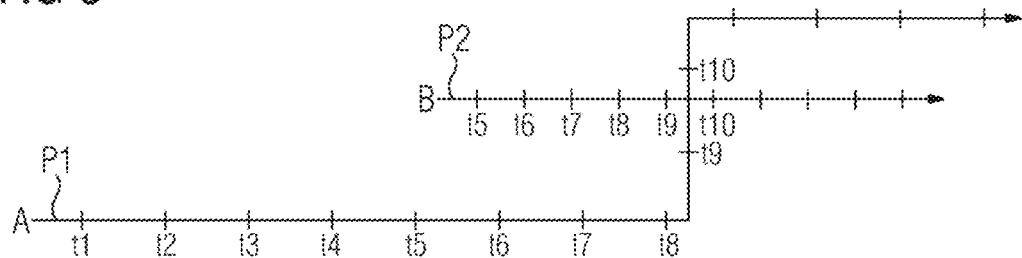
FIG. 3 depicts a schematic illustration of the time-dependent, planned paths of the autonomous vehicle and of the user according to an embodiment.

FIG. 3 depicts an example that depicts a schematic view of the planned path P1 of the autonomous vehicle A and of the planned path P2 of the user B. The respective planned paths P1, P2 show the respect reference points that are reached at the times t1 to t10. It is to be detected that there is an overlap of the paths P1 and P2 between the times t9 and t10. The path network unit 8 transmits the collision signal or the information that there is an overlap of the paths P1, P2 to the communication unit 7 (arrow 13). Since the human user B has priority over the autonomous vehicle A, the communication unit 7 transmits a blocking signal to the autonomous vehicle A and the time of the possible collision in the path network (arrow 14).

In an embodiment, the autonomous vehicle A may change the planned path P1 or calculate a planned path. According to the example in FIG. 1, this may be achieved in that the autonomous vehicle A does not turn off to the left from the first corridor 3 into the second corridor 4 but rather turns off to the right into the second corridor 4. A changed path is calculated for the autonomous vehicle A (arrow 15) and is transmitted to the communication unit 7 and from there to the path network unit 8. The time-dependent path network may then be updated by the path network unit 8 (arrow 16). It is detected that there is no overlap between the paths P1 and P2. A display device 19, that is assigned to the user B, may be correspondingly actuated (arrow 17). In addition, the reservation of the user B may be confirmed to the user. For example, the display device 19 may be assigned to a terminal 18 of the user B. The terminal 18 may be a smartphone, VR glasses, data glasses or the like. A display 20, that displays a safe zone 23 to the user B, may be provided by the display device 19. In the safe zone 23 there is no risk of a collision between the autonomous vehicle A and the user B. A virtual crosswalk 21 is displayed on the floor 22 or in the second corridor 4 here as the display 20.

In an embodiment, the autonomous vehicle A may remain on the planned path P1 and calculate its own trajectory again. For example, the speed by which the autonomous vehicle A is moved along the planned path P1 may be adapted. The changed, planned path may then be transmitted correspondingly to the communication unit 7 and from there to the path network unit 8. If the autonomous vehicle A reduces its speed or stops, for example, during the travel along the planned path P1, there is no risk of a collision with the user B. This may be detected during the checking of the time-dependent path network by the path network unit 8. The display 20 is provided to the user B.

The respective paths P1, P2 may be specified by the autonomous vehicle A and the user B. There may also be provision that the respective positions of the autonomous vehicle A and of the user B are sensed continuously with corresponding sensors, for example radar sensors or infrared sensors. In addition, movements of the autonomous vehicle A and of the user B may be transmitted continuously to the path network unit 7. Deviations from the planned paths P1, P2 may then be detected and communicated to the autonomous vehicle A and to the user B. There may also be provision that priorities relating to a right of way are specified in a flexible way. For example, the autonomous vehicle A may be assigned a higher priority than the human user B, since the autonomous vehicle A cannot simply brake. The user B may be informed that a collision may take place with the autonomous vehicle A.

Figure 4:
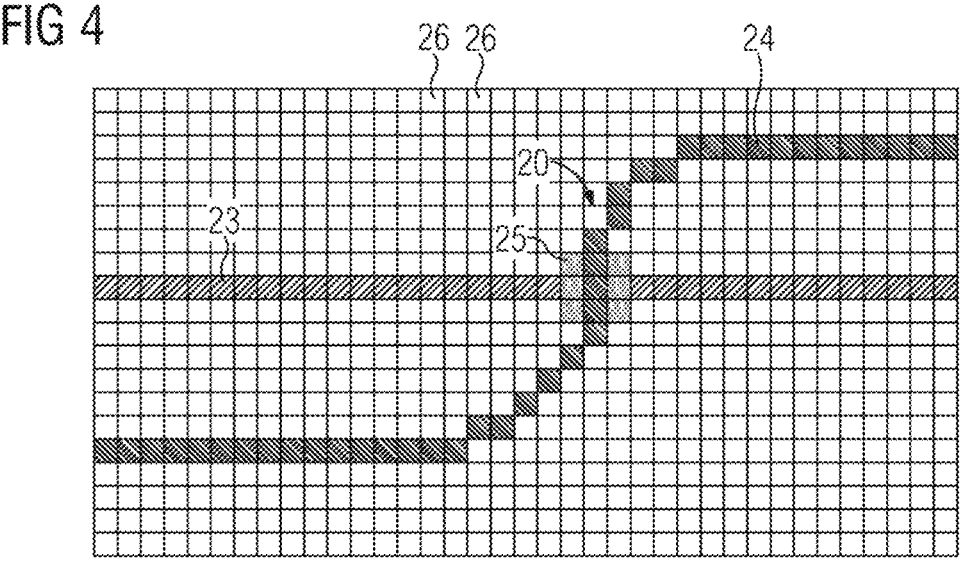
FIG. 4 depicts an illustration of a display on the factory floor according to an embodiment.

Modern factories will have floor plans in which floor-based vehicles, robots and even production units are moved in a mobile and autonomous fashion. In a further embodiment, the safe zone 23 may be displayed on the floor 22. Moreover, unsafe zones 24 may be displayed on the floor 22. For example, the safe zones 23 may be displayed as a green line, and the unsafe zones 24 as a red line. Such a display 20 may be implemented, for example, by a corresponding projection with projection elements. For example, corresponding lasers may be arranged on the ceiling of the factory 1. Alternatively, illuminated floor tiles 26, that are provided, for example, by OLED matrices or LED strips, may be used. FIG. 4 depicts in this respect an example in which the floor 22 of the factory 1 is covered with illuminated floor tiles 26. The safe zone 23 and the unsafe zone 24 are displayed for the planned paths P1, P2. In addition, a zone 25 of increased attention is displayed. The zone of increased attention 25 may be displayed, for example, in orange. By the displays, the user may be intuitively informed where he may safely move and at which locations there may be the risk of a collision with an autonomous vehicle A.

The positions and destinations of the autonomous vehicle and of the user may be recorded continuously. The optimum routes may then be calculated by the path network unit 8 and transmitted, for example, to the non-human participants. The floor tiles 26 may be illuminated for the human participants.

Figure 5:
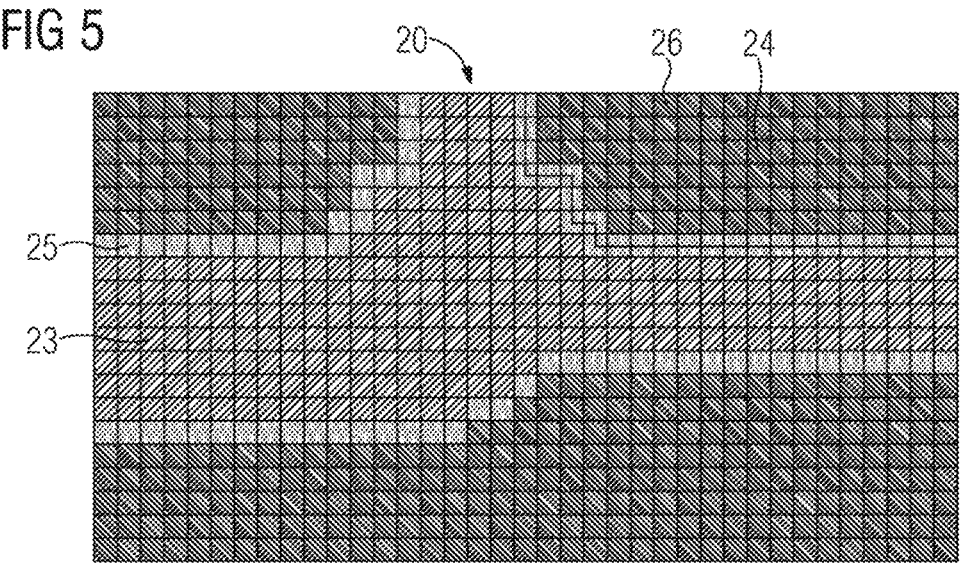
FIG. 5 depicts a display on the floor according to a further embodiment.

FIG. 5 depicts a further example in which safe zones 23 and unsafe zones 24 as well as zones of increased attention 25 are displayed dynamically. This may also be done independently of the planned paths P1, P2. The zones of increased attention 25 are displayed as transition areas between the safe zones 23 and the unsafe zones 24. In combination with working areas for humans and working areas for machines the path network unit may determine the areas that are safe for human users B.

By using the system 6 and the path network unit 8, a central control unit is provided that monitors the planned paths P1, P2 and that may block paths and may display virtual crosswalks 21 to the user B. The display 20 or the virtual crosswalk 21 may be displayed to the user B on his smartphone or a VR device. A display of the infrastructure may also be used. This provides the advantage that, in order to avoid a collision between the autonomous vehicle A and the user B, not only exclusively onboard sensors are used but also the centralized unit in the form of the path network unit 7. By the display of the virtual crosswalk 21, it may be explicitly displayed to the user B that it is possible to safely cross the corridor 4 or a road. The user may be given a feeling of safety in comparison with implied signals, for example warning lights on autonomous forklift trucks. The checking of the paths P1, P2 and the prediction of the paths P1, P2 by the path network unit 8 permit optimum adaptation of the routes in order to avoid delays. For example, an autonomous vehicle A may reach the destination 2 more quickly if it selects a different route and avoids a delay owing to a stop.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for preventing a collision between an autonomous vehicle and a user in a movement range of the autonomous vehicle, the method comprising:
receiving planned paths comprising a time-dependent, planned path of the autonomous vehicle and a time-dependent, planned path of the user;
determining a time-dependent path network by a path network unit, wherein the time-dependent path network describes the planned paths;
determining collision information that describes an overlap of the planned paths in the time-dependent path network,
determining a safe zone for the user based on the collision information, wherein the safe zone describes an area in the movement range that is safe for the user with respect to a collision with the autonomous vehicle;
determining an unsafe zone for the user based on the collision information; wherein the unsafe zone describes an area in which there is a risk of the collision;
determining an increased attention zone between the safe zone and the unsafe zone based on the collision information; and providing a display for the user on a floor by a display device, wherein the display on the floor depicts the safe zone, the unsafe zone, and the increased attention zone, wherein the safe zone, the unsafe zone, and the increased attention zone are differentiated by the display on the floor using different colors and/or patterns.

2. The method of claim 1, wherein the planned paths are received by a communication unit and are transmitted to the path network unit, the collision information is transmitted from the path network unit to the communication unit, or the planned paths are received by the communication unit and are transmitted to the path network unit and the collision information is transmitted from the path network unit to the communication unit.

3. The method of claim 1, wherein in addition to the planned path of the user a reservation for the planned path of the user is received, and the reservation is confirmed in accordance with the collision information.

4. The method of claim 1, wherein blocking information is transmitted to the autonomous vehicle when the collision information describes an overlap of the planned paths, wherein the blocking information describes that a path that is planned by the autonomous vehicle is blocked.

5. The method of claim 4, wherein the planned path of the autonomous vehicle is changed in accordance with the blocking information, and the changed planned path of the autonomous vehicle is transmitted to the path network unit.

6. The method of claim 1, wherein a position of the autonomous vehicle, a position of the user, or the position of the autonomous vehicle and the position of the user are determined continuously, and the planned paths are updated continuously.

7. The method of claim 1, wherein the user is informed about a possible collision with the autonomous vehicle if the possible collision is detected based on the collision information that the planned paths overlap.

8. The method of claim 1, wherein changes to the planned paths are determined by the path network unit, and the changes are transmitted to the autonomous vehicle, the user, or the autonomous vehicle and the user.

9. The method of claim 1, wherein the display further includes a virtual crosswalk.

10. The method of claim 1, wherein the display device is part of a terminal that is carried by the user.

11. The method of claim 1, wherein the display device comprises at least one of one or more projection devices, OLED displays, LED strips, lasers, or illuminated floor tiles.

12. The method of claim 1, wherein the method is carried out in a factory or in a warehouse.

13. A system for preventing a collision between an autonomous vehicle and a user in a movement range of the autonomous vehicle, the system comprising:

a path network unit configured to receive planned paths comprising a time-dependent, planned path of the autonomous vehicle and a time-dependent, planned path of the user, and determine a time-dependent path network, wherein the time-dependent path network describes the planned paths, the path network unit further configured to determine collision information that describes an overlap of the planned paths in the time-dependent path network, and to determine a safe zone, an unsafe zone, and a increased attention zone for the user based on the collision information, wherein the safe zone describes an area in the movement range which is safe for the user with respect to a collision with the autonomous vehicle, the unsafe zone describes an area in which there is a risk of the collision, and the increased attention zone is between the safe zone and the unsafe zone; and a display device comprising at least one of one or more projection devices, OLED displays, LED strips, lasers, or illuminated floor tiles, the display device configured to provide a display on a floor for the user including where the safe zone, the unsafe zone, and the increased attention zone are differentiated by the display on the floor using different colors and/or patterns.

14. The system of claim 13, further comprising:
a communication unit configured to receive and transmit the planned paths or the collision information.

15. The system of claim 13, wherein the path network unit is further configured to receive a reservation for the planned path of the user and confirm the reservation in accordance with the collision information.

16. The system of claim 13, wherein the path network unit is configured to transmit blocking information to the autonomous vehicle when the collision information describes an overlap of the planned paths, wherein the blocking information describes that a path that is planned by the autonomous vehicle is blocked.

17. The system of claim 16, wherein the planned path of the autonomous vehicle is changed in accordance with the blocking information, and the changed planned path of the autonomous vehicle is transmitted to the path network unit.

18. The system of claim 13, wherein a position of the autonomous vehicle, a position of the user, or the position of the autonomous vehicle and the position of the user are determined continuously by the path network unit, and the planned paths are updated continuously.

19. The system of claim 13, wherein changes to the planned paths are determined by the path network unit, and the changes are transmitted to the autonomous vehicle, the user, or the autonomous vehicle and the user.

20. The system of claim 13, wherein the display further includes a virtual crosswalk.

* * * * *